US007814899B1

(12) United States Patent
Port

(10) Patent No.: US 7,814,899 B1
(45) Date of Patent: Oct. 19, 2010

(54) SOLAR PANEL MOUNTING SYSTEMS

(76) Inventor: Jonathan Port, 11977 San Vincente Blvd., Los Angeles, CA (US) 90049

( * ) Notice: Subject to any disclaimer, the term of this patent is extended or adjusted under 35 U.S.C. 154(b) by 350 days.

(21) Appl. No.: 11/428,558

(22) Filed: Jul. 4, 2006

(51) Int. Cl.
E04D 13/18 (2006.01)
E04H 14/00 (2006.01)

(52) U.S. Cl. .................. 126/623; 126/271; 126/581; 52/22; 52/173.3; 248/237; 248/519

(58) Field of Classification Search .......... 126/623, 126/704; 52/22, 173.3
See application file for complete search history.

(56) References Cited

U.S. PATENT DOCUMENTS

| 5,578,142 A | * | 11/1996 | Hattori et al. ............ 136/251 |
| 6,046,399 A | * | 4/2000 | Kapner .................. 136/244 |
| 6,205,719 B1 | | 3/2001 | Bruce .................... 52/147 |
| 6,269,596 B1 | * | 8/2001 | Ohtsuka et al. ........... 52/173.3 |
| 6,360,491 B1 | | 3/2002 | Ullman |
| 6,405,494 B1 | | 6/2002 | Wismeth |
| 6,612,530 B1 | * | 9/2003 | Kwak et al. ............. 248/317 |
| 6,672,018 B2 | | 1/2004 | Shingleton |
| 6,968,654 B2 | | 11/2005 | Moulder et al. |
| 2004/0128923 A1 | * | 7/2004 | Moulder et al. ........ 52/173.1 |

FOREIGN PATENT DOCUMENTS

DE 20301389 U1 * 4/2004

* cited by examiner

Primary Examiner—Steven B McAllister
Assistant Examiner—Nikhil Mashruwala
(74) Attorney, Agent, or Firm—Norton B. Townsley; Belasco Jacobs & Townsley, LLP

(57) ABSTRACT

In a first embodiment a framed solar panel is retained by a rod inserted through a hole in the panel frame. The rod is attached to the top of a bracket, which is mounted at its bottom to a substantially flat surface. In a second embodiment, a framed solar collector panel is retained by a clip which is designed to fit over the top edge of the frame. The clip is then attached to the top of a second bracket. In a fourth embodiment a tether is fastened between the through hole and the flat surface. These embodiments may be used at either or both ends of the frame. Each embodiment may include a safety tether that is connected between the frame and the bracket.

8 Claims, 15 Drawing Sheets

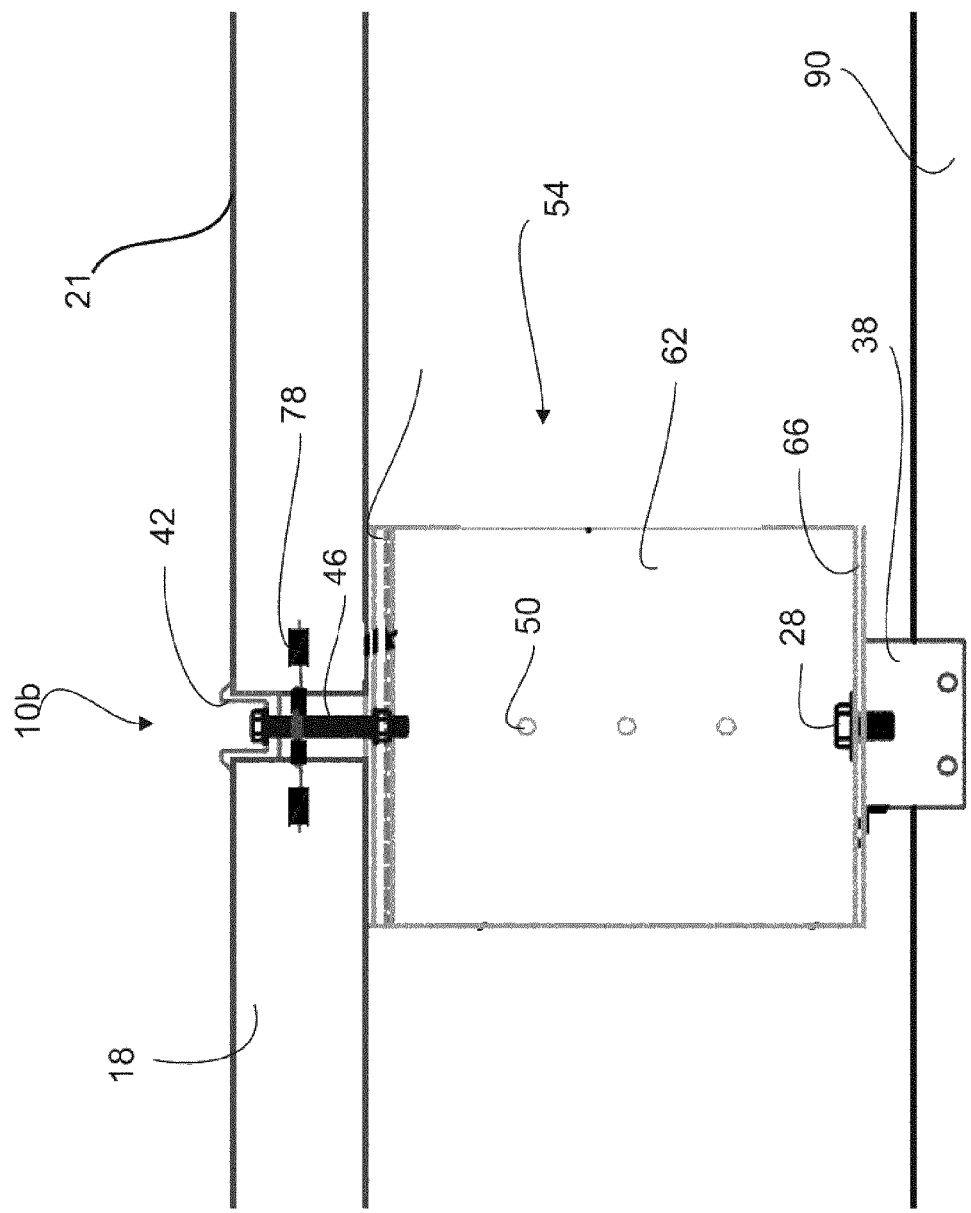

SOLAR PANEL MOUNTING SYSTEMS

BACKGROUND OF THE INVENTION

1. Field of the Invention

The present invention relates to the field of solar energy collection. More specifically, this invention is directed toward a method of attaching solar collecting panels to a wide array of mounting surfaces.

2. Description of Prior Art

Solar panels are typically mounted on a mounting structure, which is supported on a mounting surface, such as a rooftop. Existing mounting structures are often limited as to the type of surface to which they can be attached, their ability to affix adjoining panels with a single system, and/or the positioning of the panels on the mounting surface.

There have been a number of developments in this area. U.S. Pat. No. 6,360,491 (Ullman) discloses an L-shaped end clamp used to secure a solar panel. The end clamp has a hole for alignment with a threaded hole on a horizontal rod insert. The end clamp further has a notched surface for frictionally engaging the solar panel and securing it between the notched surface and the horizontal rod when the end clamp bolt is threaded through the end clamp hole and the threaded hole on the insert. A bimodule clamp is also disclosed which is used to secure the sides of two adjoining solar panel models to a horizontal rod when the bi-module clamp is threadably fastened to an insert with a bolt.

U.S. Pat. No. 6,672,018 (Shingleton) discloses a solar collector array mounted to a frame of sheet metal channels. Clips are used to clamp the panels to the support beams. The clips have an upper portion that is generally T-shaped in profile and a retainer in the form of a channel nut or bar with a threaded hole that received a bolt. The retainer biases against the inwardly directed flanges of the support beam.

U.S. Pat. No. 6,405,494 (Wismeth) discloses a solar module assembly including a profiled rail with a longitudinally extending slot therein and a clip with a hook for fixing the solar module to the rail when the clip is inserted into the slot.

U.S. Pat. No. 6,414,237 (Boer) discloses a solar collector wherein a solar module is secured to a profile channel which is secured to a support structure. A solar module bracket with a profile channel engagement hook is attached to the frame of the solar module and is positioned such that the engagement hook is placed in an opening in the profile channel. The hooking portion of the engagement hook extends parallel to the direction of the profile channel, thereby securing the solar module on to the channel.

U.S. Pat. No. 6,968,654 (Moulder et al) discloses a frame on a mounting surface for a solar panel. The frame has a front wall, and bottom wall and a back wall and an elongated chamber. Panel supports, which may be formed from as few as two bends in the frame structure, extend from the front wall and the back wall. A solar panel may be supported on the two panel supports, thereby enclosing the elongated chamber. The panel supports may include holes that may be aligned with holes in the solar panel frame. A screw may be threaded through the aligned hole of the panel support and the hole of the panel itself to secure the panel to the frame.

Development of a solar panel mounting system that minimizes the number of attachment mechanisms, thus facilitating installation, and provides greater freedom of mounting positions represents a great improvement in the field of solar energy collection.

SUMMARY OF THE INVENTION

The present invention is a solar panel mounting system that minimizes the number of attachment mechanisms, thus facilitating installation, and provides greater freedom of mounting positions In a first embodiment, the present invention provides a system for mounting a solar collector panel to a substantially flat surface, such as a roof. The panel is supported within a frame that has at least one through hole near its end, which extends perpendicular to the frame. The system includes a bracket, which can be any one of a variety of shapes, including L, T, or U shaped. A rod, which is attached to the top of the bracket, substantially right angles, is inserted into the through hole of the frame. The bracket is mounted at its bottom end to a substantially flat surface, such as a roof or the top of a standing seam roof clamp. This system allows the solar panel to be supported at an angle to the flat surface on which it is mounted. The system may include a safety tether that is connected between the frame and the bracket.

In a second embodiment, the framed solar collector panel is retained by a clip which is designed to fit over the top edge of the frame. The clip is then attached to a substantially flat surface. The flat surface to which the clip is attached could be a number of different things, including a roof, the top of a standing seam roof clamp and the top leg of a bracket that is essentially C or Z shaped. The top leg is attached to the middle leg at a predetermined angle, which is selected such that the system will support the solar panel at a desired angle to the horizontal. The system may include a safety tether that is connected between the frame and the bracket.

A third embodiment includes a first embodiment at one end of the frame and a second embodiment at the other end of the frame. Preferably, the first embodiment is at the lower end of the frame and the second embodiment is at the higher end of the frame.

In a fourth embodiment, a tether, which is designed to break at a predetermined stress, is fastened between the through hole and the flat surface. An additional safety tether may also be connected between the frame and the flat surface.

A fifth embodiment includes a fourth embodiment at one end of the frame and a first embodiment at the other end of the frame. Preferably, the fourth embodiment is at the lower end of the frame and the first embodiment is at the higher end of the frame. An appreciation of the other aims and objectives of the present invention and an understanding of it may be achieved by referring to the accompanying drawings and description of a preferred embodiment.

BRIEF DESCRIPTION OF THE DRAWINGS

FIG. 14 is a detailed end view of the higher end of the embodiment illustrated in FIG. 12 with the optional safety tether.

DETAILED DESCRIPTION OF THE PREFERRED EMBODIMENT

Figure 1:
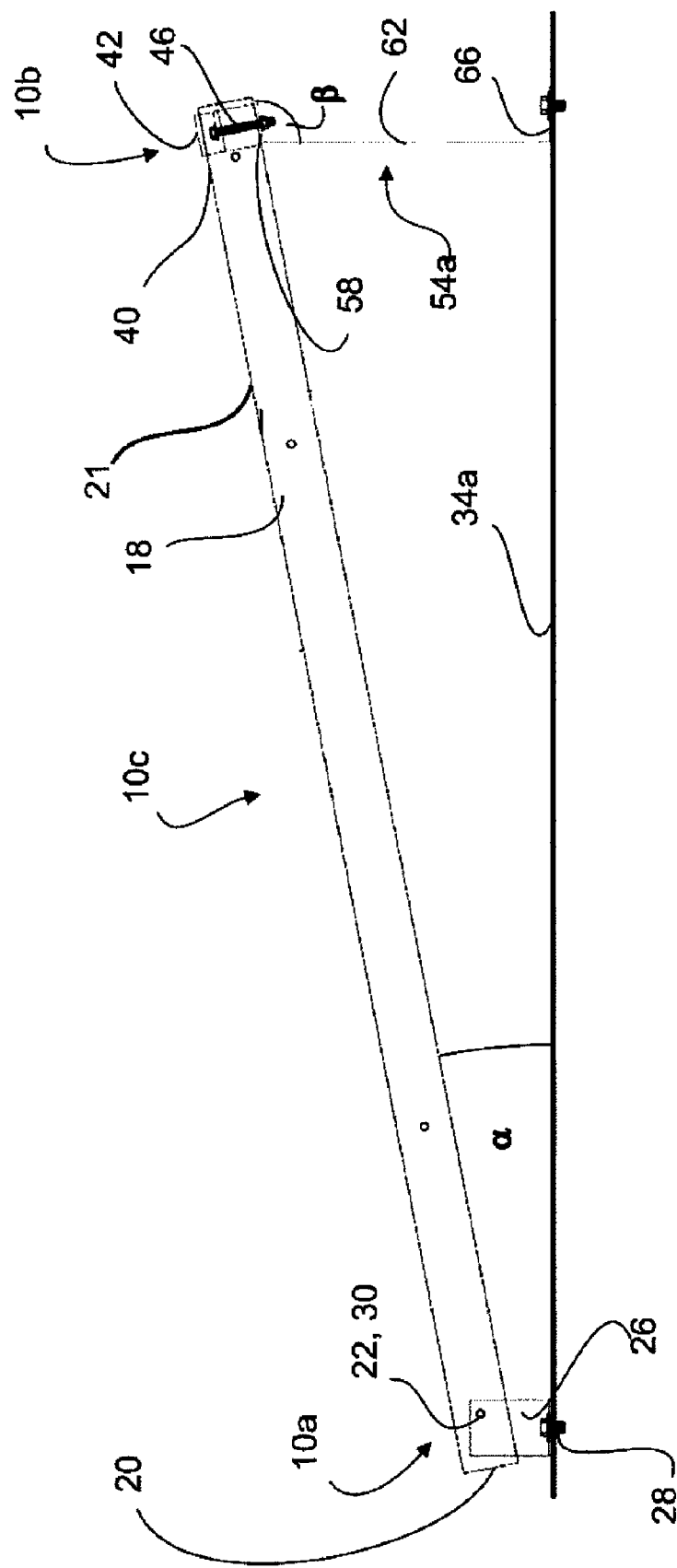
FIG. 1 is a side view of a third embodiment of this invention, mounted to a substantially flat surface.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The first embodiment 10a of this invention, also known as the pivot end, is illustrated in FIGS. 1, 2, 3, 6, 7, 9 and 11. This embodiment 10a is applied to a solar collector panel 14 with frame 18 that has at least one through hole 22 near one end 20, which extends perpendicular to the frame 18. One solar panel 14 with frame 18 with which this invention may be used is the Schott ASE 310-W Solar Module. The embodiment 10a comprises a bracket 26. This bracket 26 can be any one of a variety of shapes, including L 26a, T 26b, or U 26c shaped. A pivot rod 30, which is attached to the top 27 of the bracket 26 at substantially right angles, is inserted into the through hole 22 of the frame 18. The rod 30 can be threaded, as illustrated, and fastened to the bracket with a pair of nuts 32. Alternatively it could be smooth. If smooth, it could be supplied with, optionally, a hole and cotter pin at its outer end 29 (not illustrated). Alternatively, the rod could be a quick release pin 30a. Those most familiar with the art to which this invention pertains will appreciate that there are many other mechanisms for pivotal attachment between the bracket 26 and the hole 22 through the frame 18.

The first embodiment 10a also includes a means 28 for mounting the bottom 36 of the bracket 26 to a substantially flat surface, such as a roof 34a or the top 34b of a standing seam roof clamp 38. The standing seam roof clamp 38 is well known in the field of solar panel installation and is used to attach solar panels to standing seam roofs 34c. It will be understood that a roof 34a, 34b can be horizontal or at an angle to the horizontal. The attachment means 28 can be a bolt, a screw, a rivet, adhesive or any other means for attaching two surfaces together. The first embodiment 10a allows the solar panel 14 to be supported at an angle α to the flat surface on which it is mounted. This embodiment 10a can be used at either or both ends 20, 40 of the frame 18. The brackets 26 at each end can be of identical or different heights H. If the brackets 26 are of different heights H, the solar panel will be installed at an angle α to the flat surface.

The second embodiment 10b of this invention, also known as the clamped end, which is illustrated in FIGS. 1, 2, 4, 5, 6, 8, 12, 13 and 14 is a clip 42 which is specially designed to retain the frame 18. The clip 42 is attached to another substantially flat surface. The means 46 for attaching the clip 42 to this substantially flat surface is preferably a bolt or a screw with mating nut. However, other means for clamping the clip 42 to flat surface can certainly be conceived. The flat surface to which the clip 42 is secured can be a flat roof 34a, the top surface 34b of a standing seam roof clamp 38 or the top leg 58 of a second bracket 54. The top leg 58 is attached to the middle leg 62 at a predetermined angle β in order to allow the solar collector 18 to be installed at the angle α. This middle leg 62 is then attached to a bottom leg 66 at a right angle. The bottom leg 66 is attached to the substantially flat surface such as a flat roof 34a or the top 34b of a standing seam roof clamp. This second bracket 54 can take on a number of shapes, including a C-shape 54a and a Z-shape 54b.

The second embodiment 10b can be used at either or both ends 20, 40 of the frame 18. If a second bracket 54 is used at one end, the solar panel 18 can be installed at an angle α to the flat surface. See FIGS. 12-14.

Figure 2:
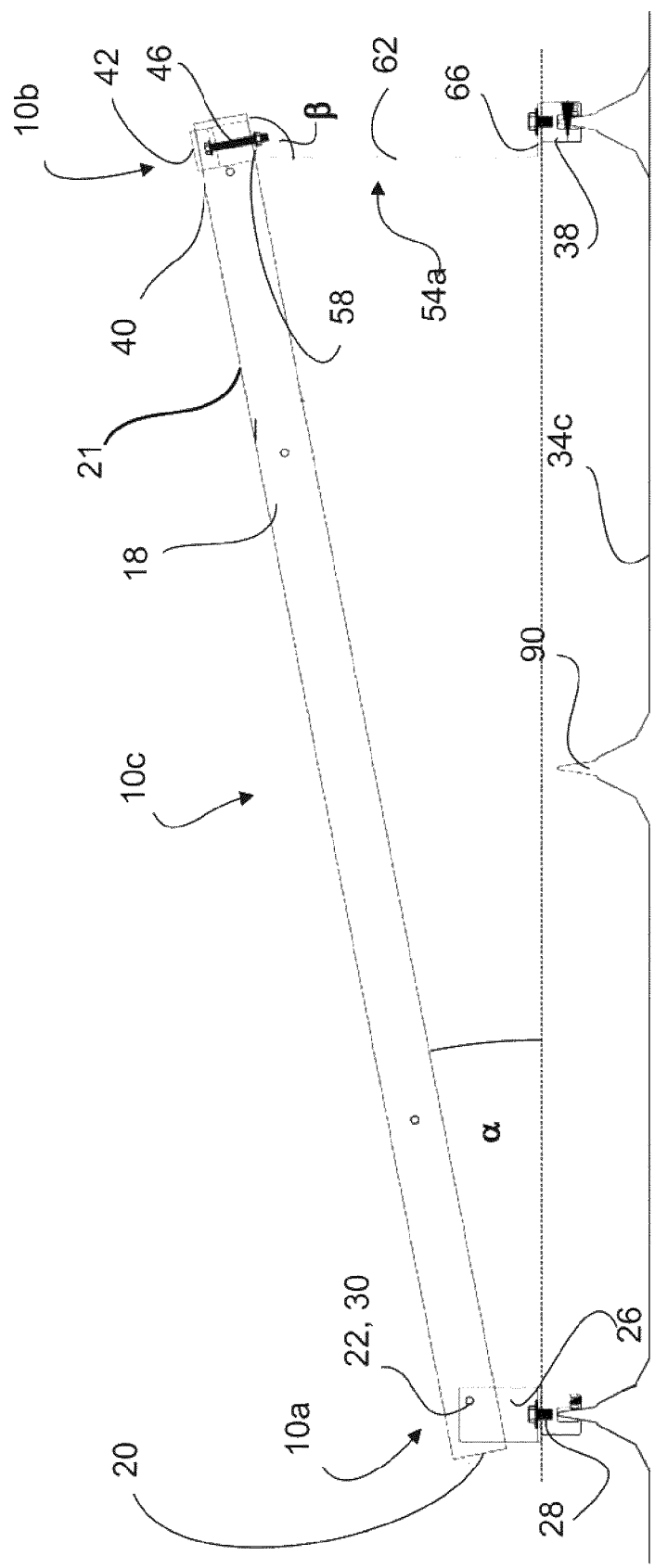
FIG. 2 is a side view of a third embodiment of this invention attached to the tops of standing seam roof clamps which are attached to a standing seam roof.
Figure 6:
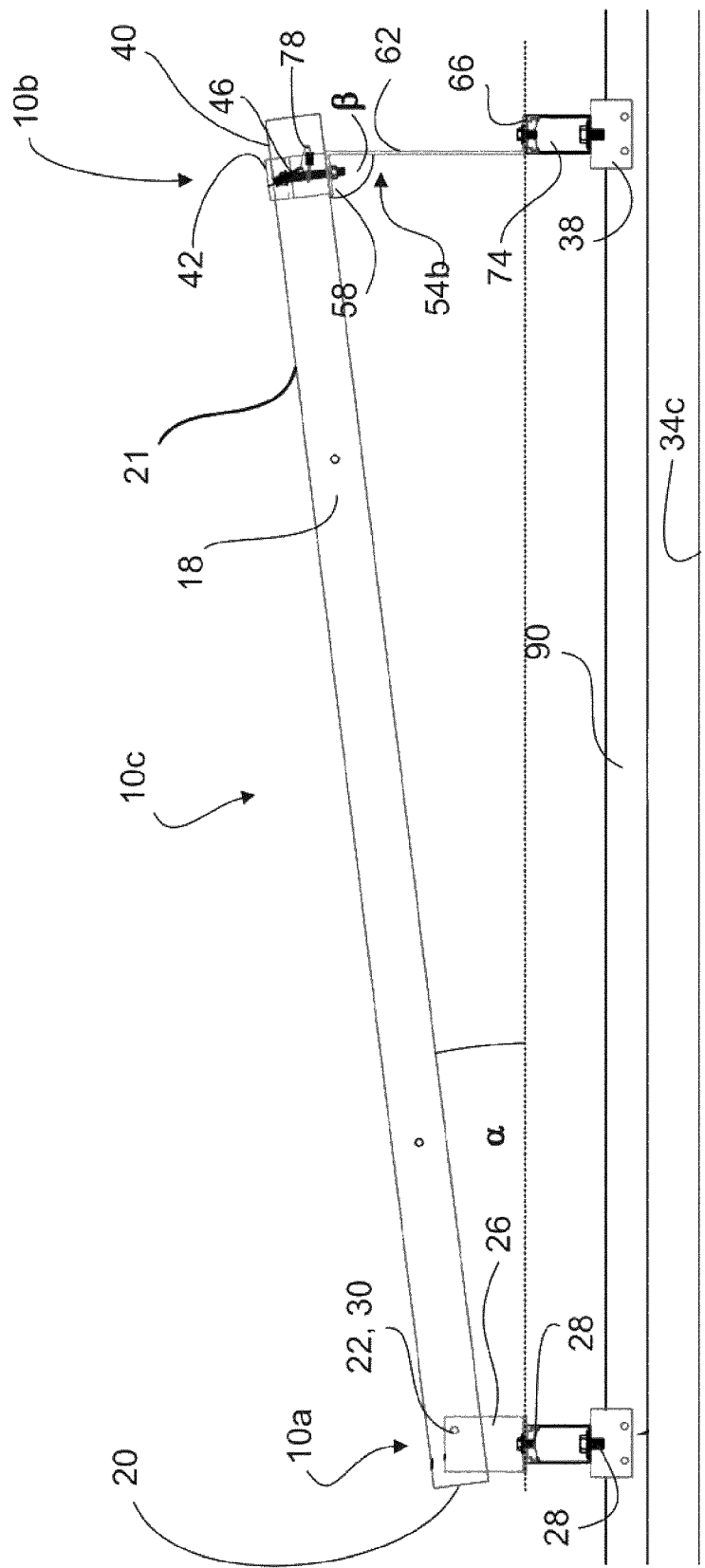
FIG. 6 is a side view of the third embodiment of this invention, including one pivot end and one clamped end, mounted to channels, which span between adjacent standing seam roof clamps.
Figure 7:
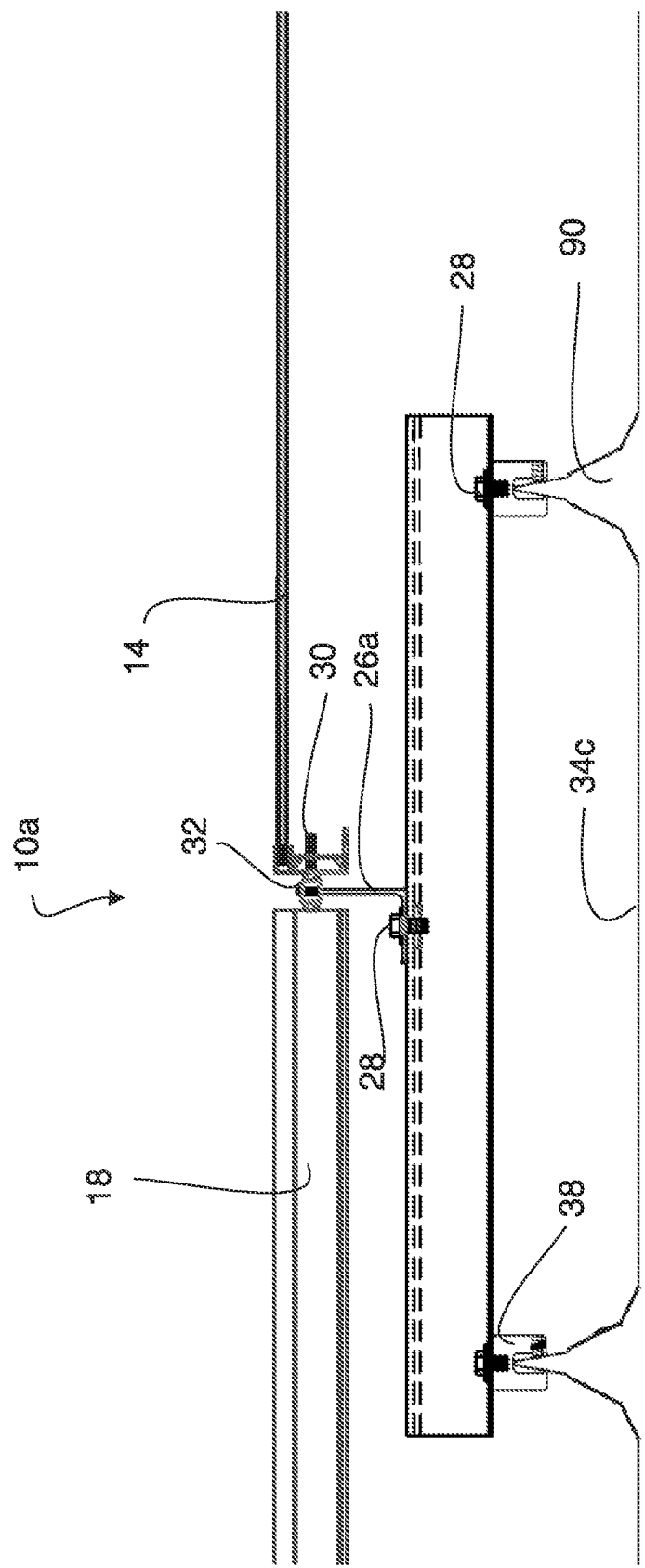
FIG. 7 is a detailed, partial cross-sectional view of the embodiment illustrated in FIG. 6 at thepivot end.
Figure 8:
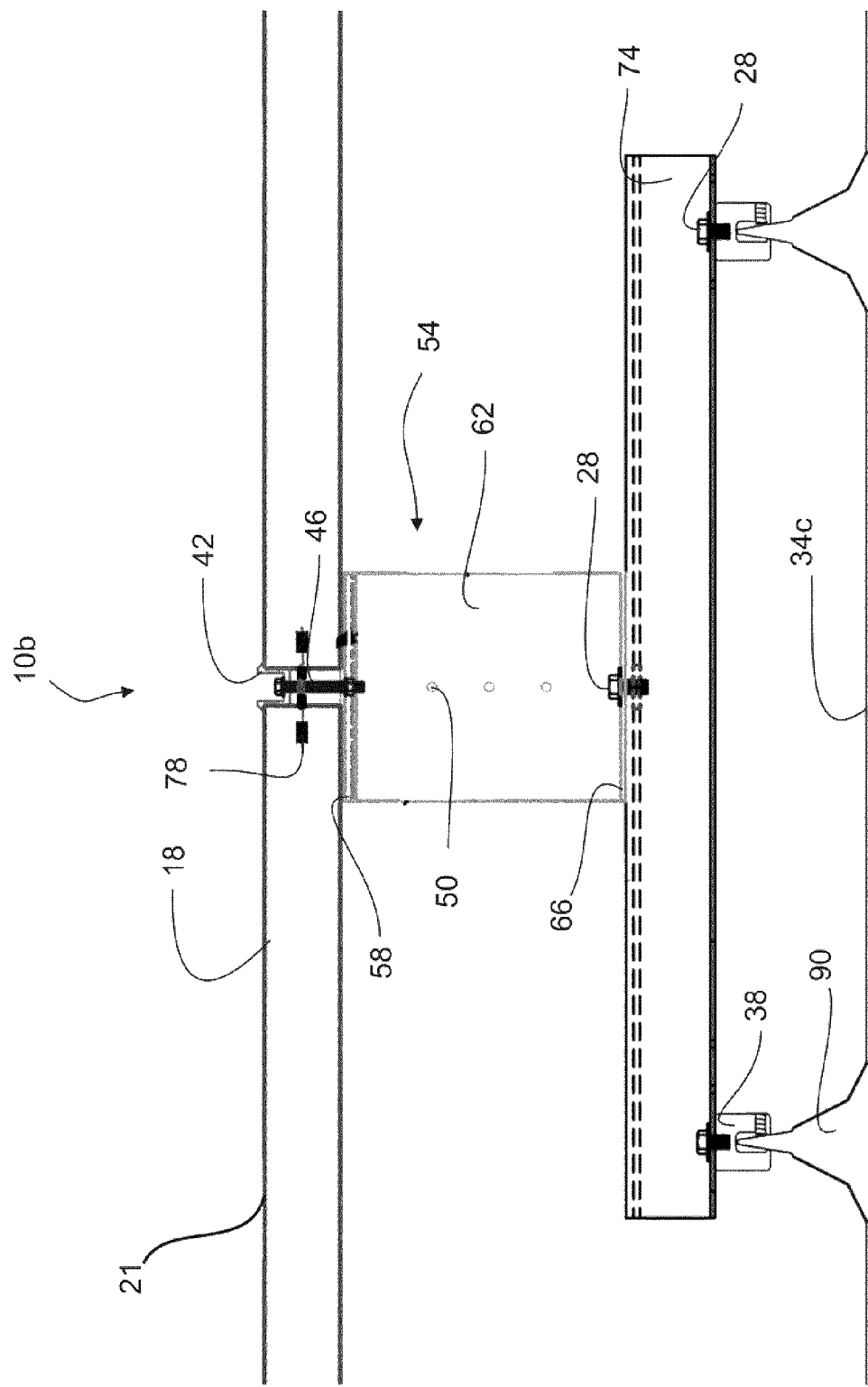
FIG. 8 is a detailed, partial cross-sectional view of the embodiment illustrated in FIG. 6 from the clamped end.
Figure 9:
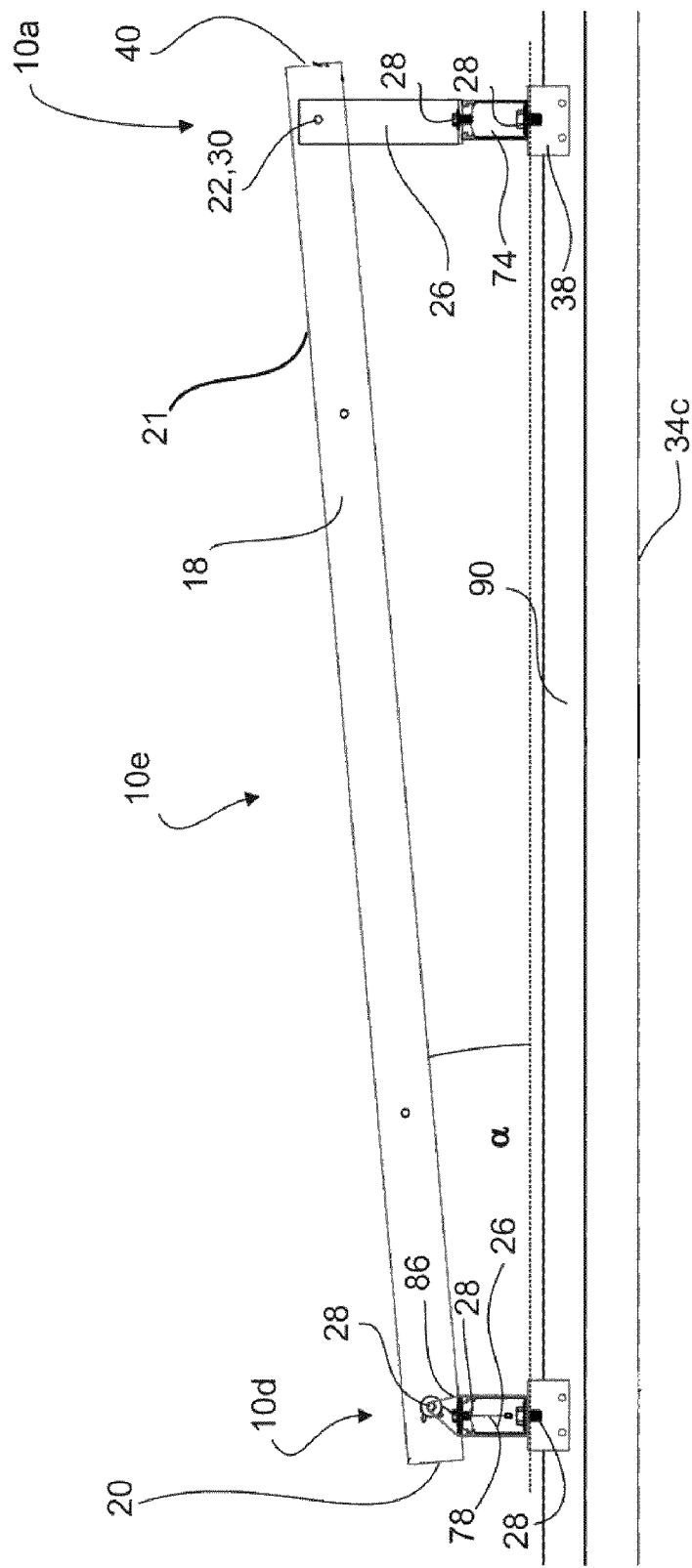
FIG. 9 is a side view of a fifth embodiment of this invention, mounted to channels, which span between adjacent standing seam roof clamps.
Figure 10:
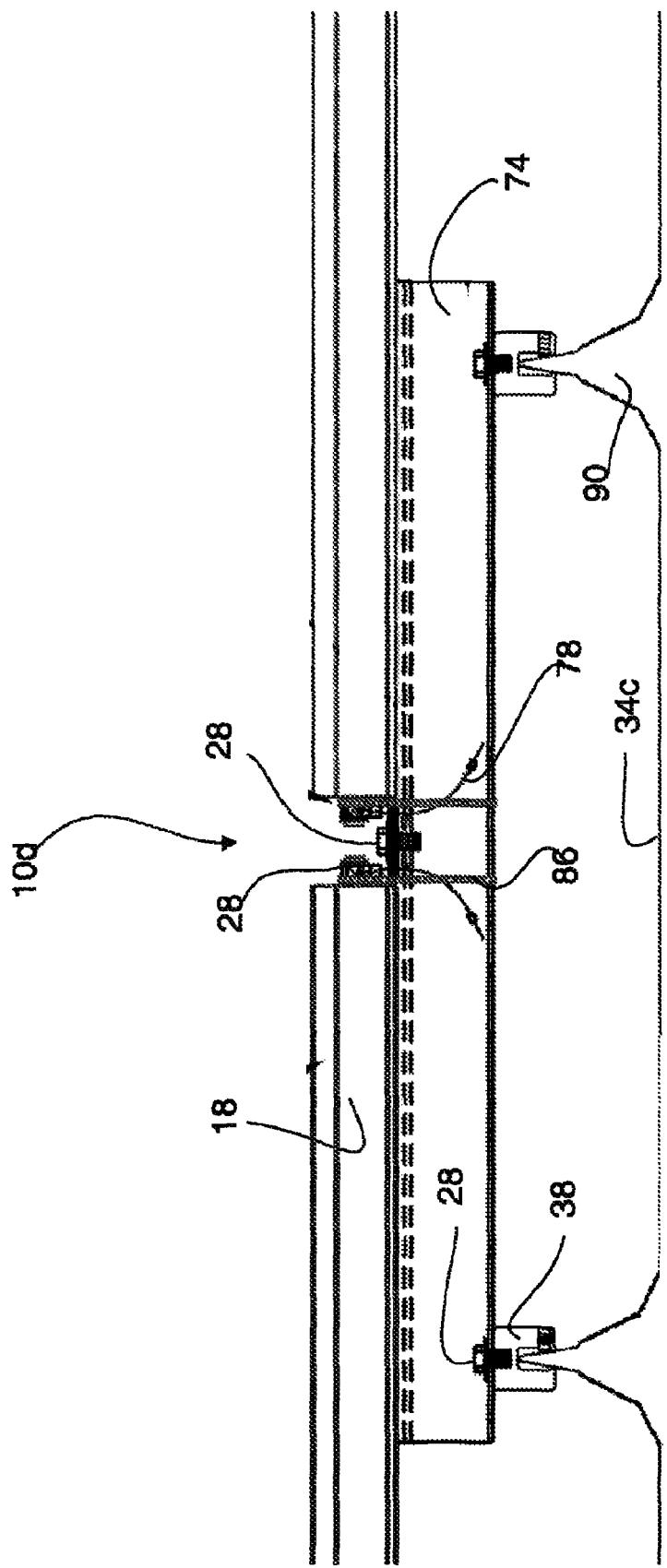
FIG. 10 is a detailed, partial cross-sectional view of the embodiment illustrated in FIG. 9, from the tether end also illustrating the optional safety tether.
Figure 11:
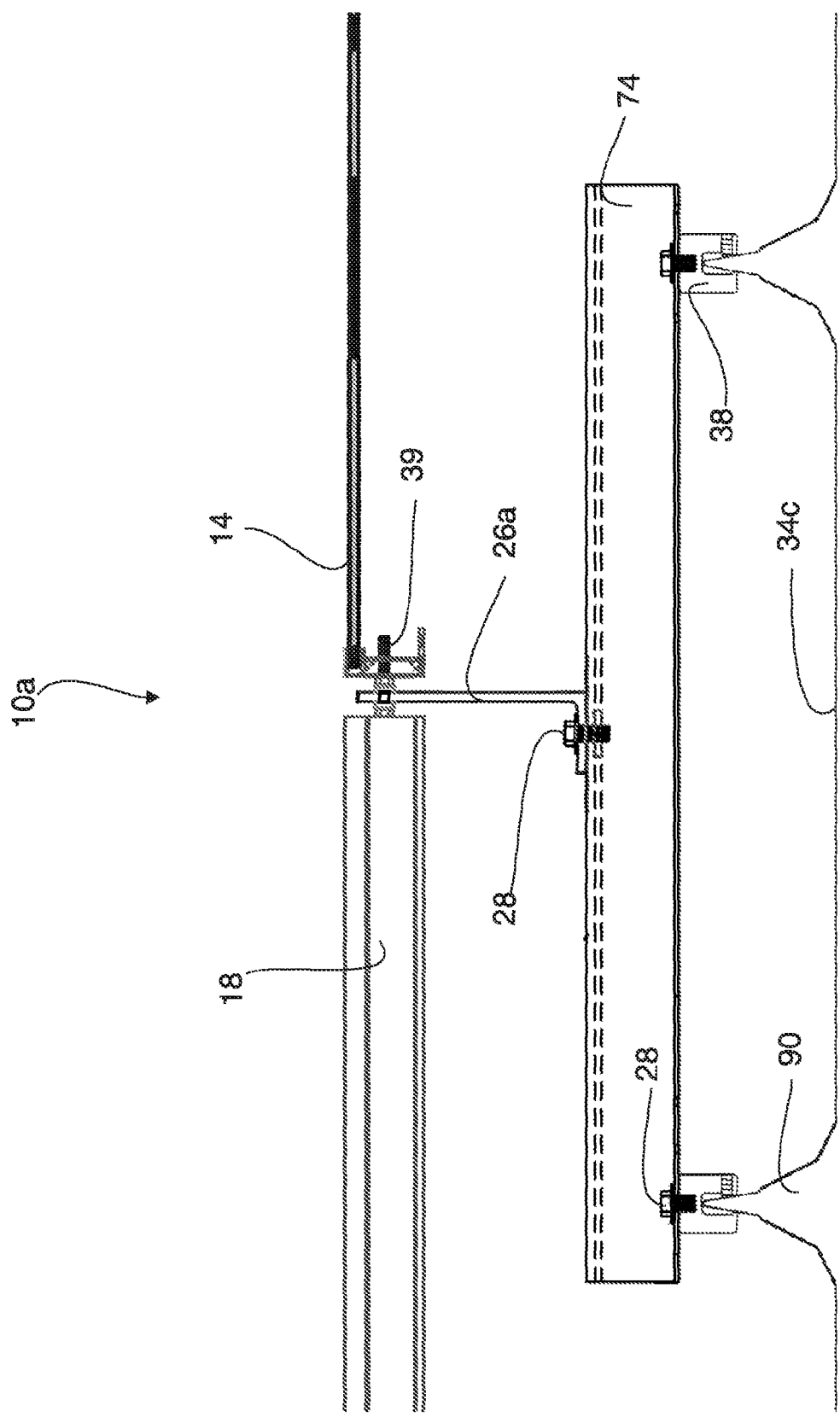
FIG. 11 is a detailed, partial cross-sectional view of the embodiment illustrated in FIG. 9, from the pivot end.
Figure 12:
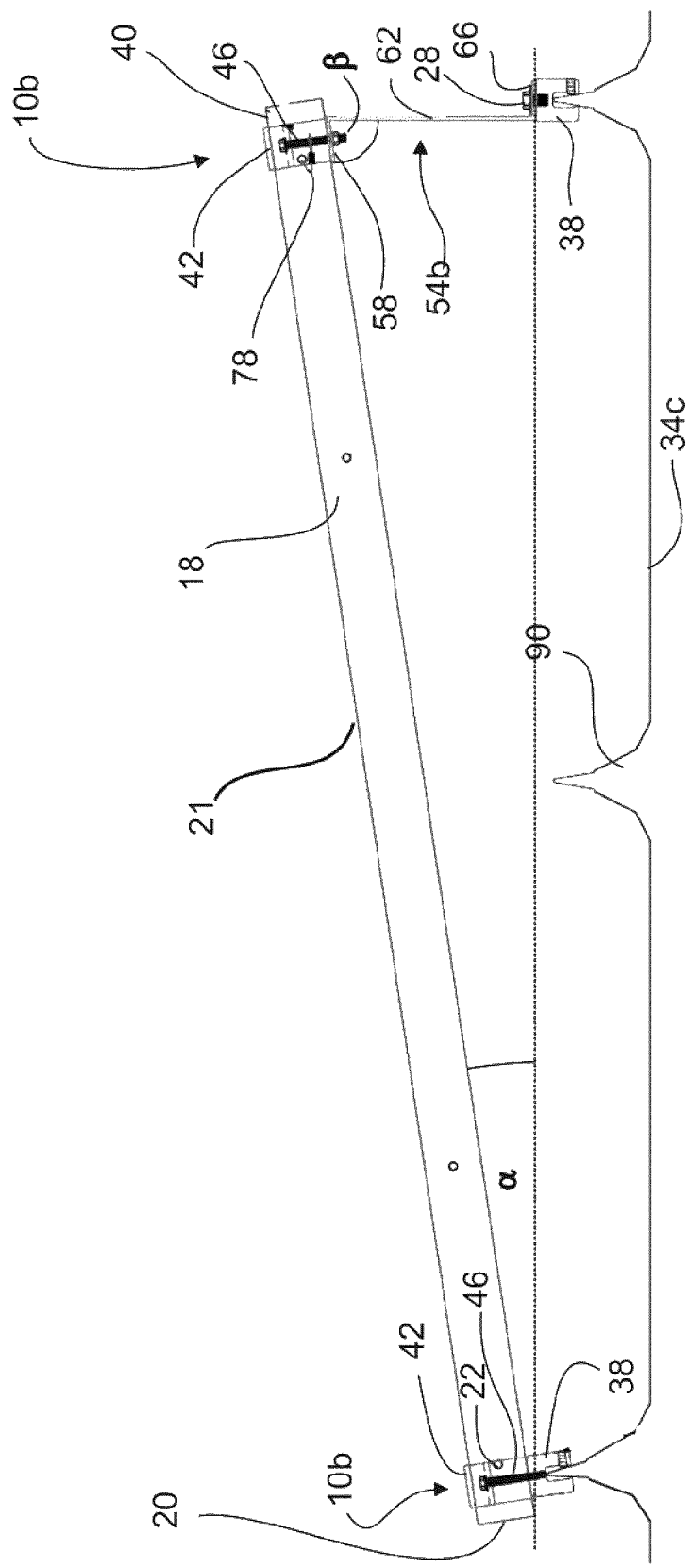
FIG. 12 is a side view of the second embodiment of this invention, including, attached to the tops of standing seam roof clamps which are attached to a standing seam roof.
Figure 13:
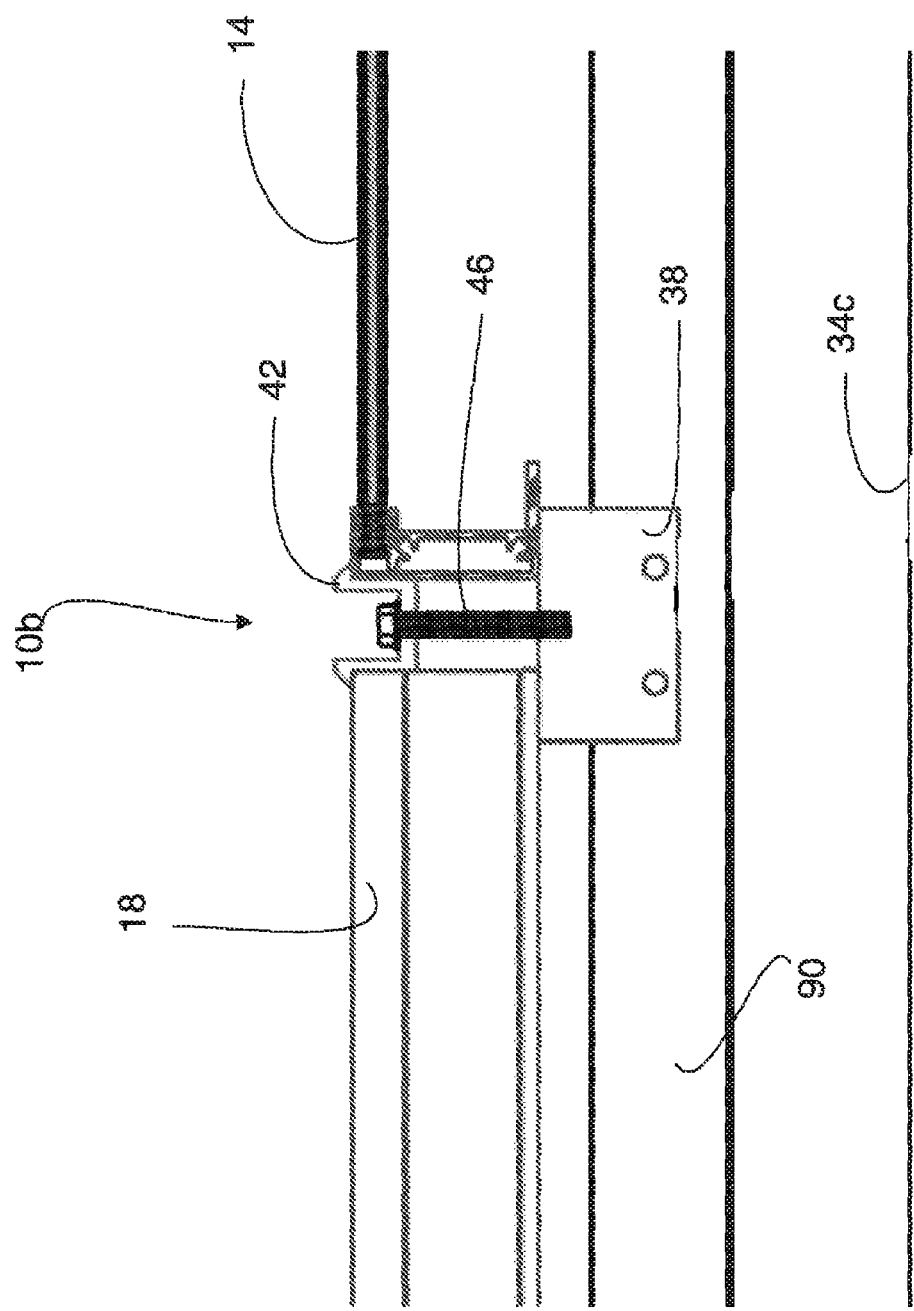
FIG. 13 is a detailed, partial cross-sectional end view of the lower end of the embodiment illustrated in FIG. 12.

A third embodiment 10c is illustrated in FIGS. 1, 2 and 6. This embodiment is a combination of a first embodiment 10a at one end 20 of the frame 18 and a second embodiment 10b at the other end 40 of the frame 18, A fourth embodiment 10d, also known as the tether end, is illustrated in FIGS. 9 and 10. In this embodiment a tether 86 is used to fasten the hole 22 to the flat surface. The tether 86 is designed to break at a predetermined stress. In this way the applicable end 20 or 40 of the solar panel 18 will break loose from its attachment in extremely windy weather. Any convenient attachment means, such as bolts, screws, rivets adhesive, etc. may be used. Again the flat surface may be a roof 34a, a standing seam roof clamp 38 or the top leg 58 of a second bracket 54. The fourth embodiment 10b can be used at either or both ends 20, 40 of the frame 18. If a second bracket 54 is used at one end 20 or 40, the solar panel 18 can be installed at an angle α to the flat surface.

A fifth embodiment is illustrated in FIG. 9. This embodiment is a combination of a fourth embodiment 10d at one end 20 of the frame 18 and a first embodiment 10a at the other end 40 of the frame 18.

Figure 3:
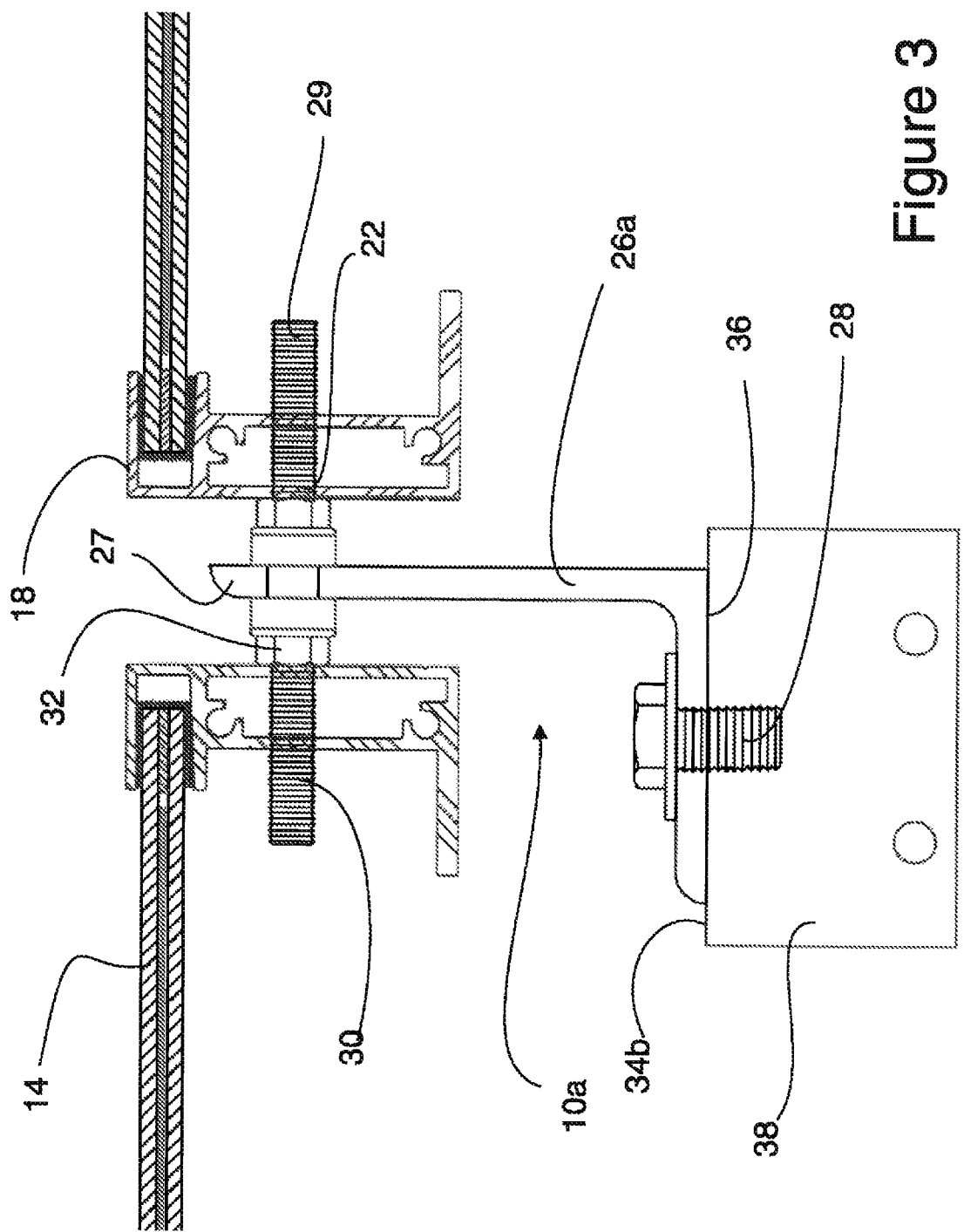
FIG. 3 is a detailed cross-sectional view of a first embodiment or pivot end of this invention. In this Figure the bracket is L-shaped.
Figure 3A:
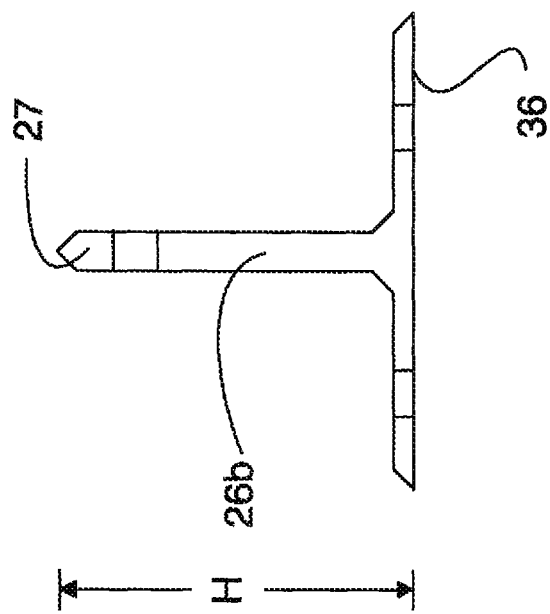
FIG. 3A is a cross sectional view of the alternative T-shaped bracket.
Figure 3B:
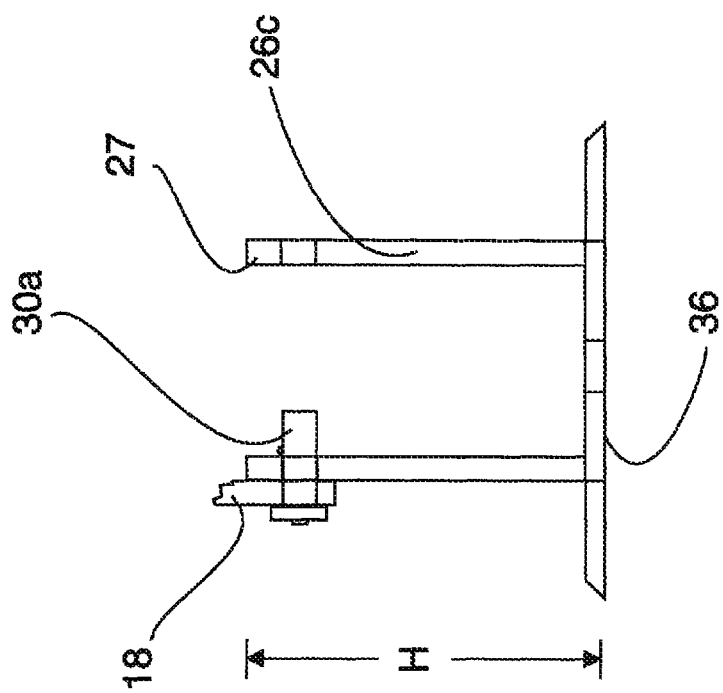
FIG. 3B is a cross-sectional view of the alternative U-shaped bracket.
Figure 4:
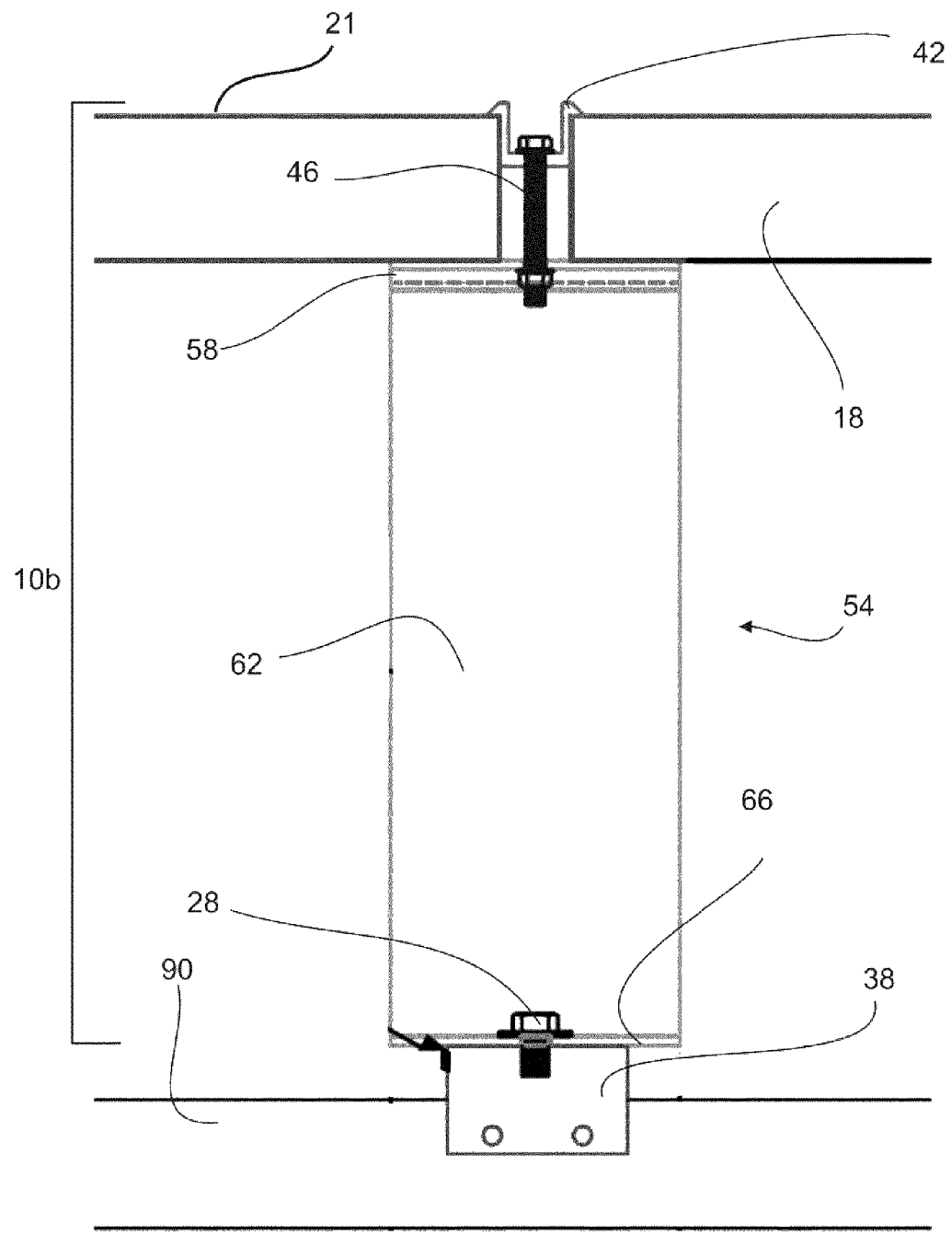
FIG. 4 is a detailed view of the second embodiment or clamped end of this invention from the end.
Figure 5:
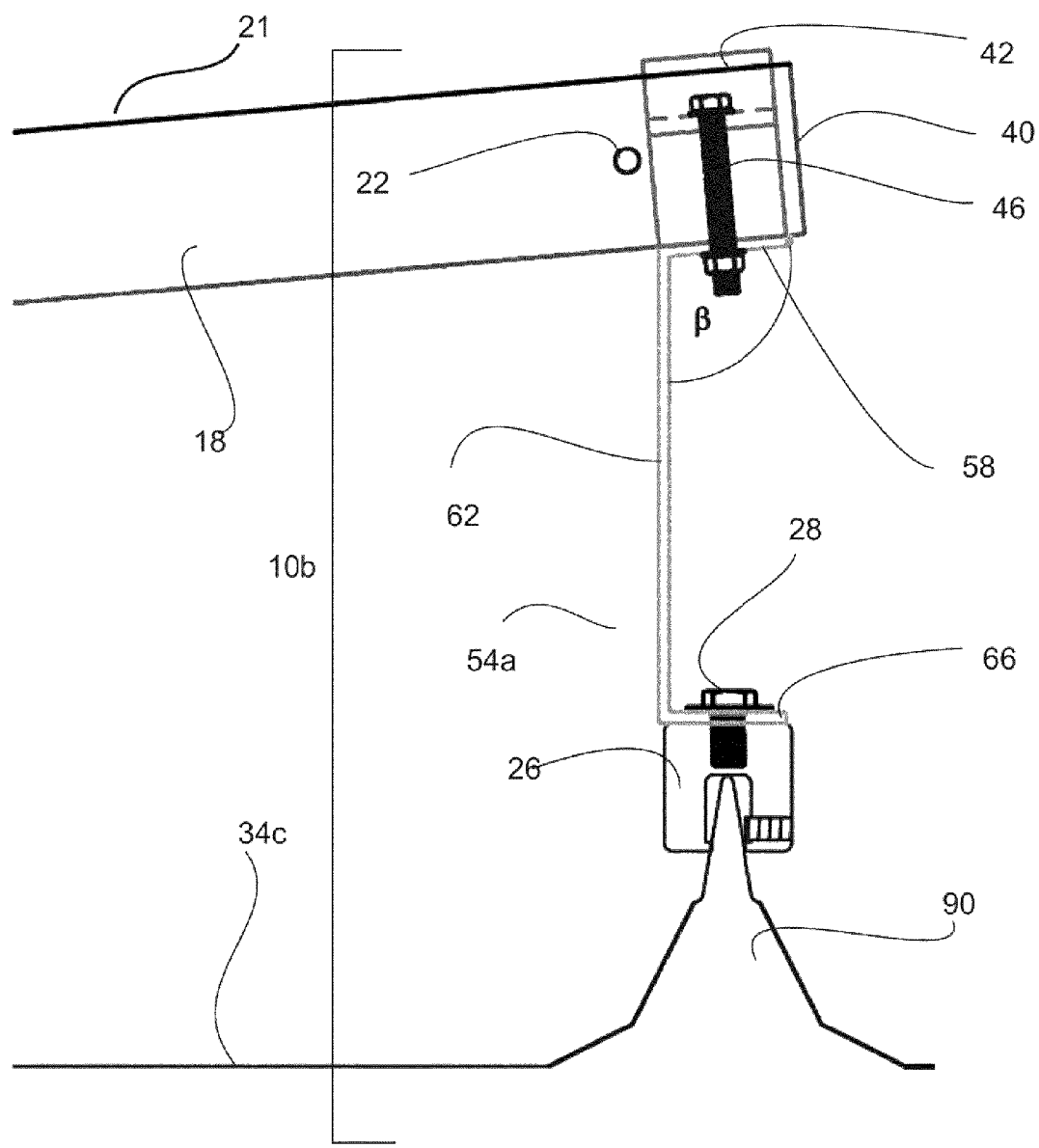
FIG. 5 is detailed side view of the second embodiment or clamped end of this invention mounted to the top of a standing seam roof clamp which is attached to the standing seam of a standing seam roof.

Any of the above described embodiments 10a-10e may be designed for single panel or double panel installation. The Figures all illustrate double panel installation. For example FIG. 3 illustrates one bracket 26a supporting two rods 30 (on either side of the bracket), which in turn support two frames 18. It will readily be understood by those most familiar with the art to which this invention pertains that embodiment 10a could be designed with a bracket supporting one rod 30 (on one side of the bracket) and one frame 18.

While particular combination embodiments 10c, 10e have been described, it will be understood by those most familiar with the art to which this invention pertains, that any of the embodiments 10a, 10b, 10d can be used on each end 20, 40 of the panel. Also, a safety tether 78 may be used with any of the above described embodiments. A safety tether 78 attaches between the frame 18 and the flat surface. Safety tethers 78 are designed with a particular length and so as to retain the panels 18 on the flat surface in case any of the embodiments 10a, 10b, and 10d break. The optional safety tethers 78 are illustrated in FIGS. 6, 8, 9, 10, 12 and 14. Furthermore, in cases where embodiments must be attached to a standing seam roof 34c between standing seams 90, a channel 74 or equivalent member may be attached to span between adjacent standing seams 90.

The following reference numerals are used on FIGS. 1 through 14:

10a First embodiment
10b Second embodiment
10c Third embodiment
10d Fourth embodiment
10e Fifth embodiment
14 Solar collector panel
18 Frame for solar collector panel
20 One end of frame
21 Top edge of frame
22 Through hole in frame
26 First bracket
26a L-shaped first bracket
26b T-shaped first bracket
26c U-shaped first bracket
27 Top of first bracket
28 Fastener
29 Outer end of pivot rod
30 Pivot rod
30a Quick release pin
32 Nut
34a Roof
34b Top of standing seam roof clamp
34c Standing seam roof
36 Bottom of first bracket
38 Standing seam roof clamp
40 Other end of frame
42 Clip
46 Means for attaching clip
50 Lightening hole
54 Second bracket
54a C-shaped second bracket
54b Z-shaped second bracket
58 Top leg of second bracket
62 Middle leg of second bracket
66 Bottom leg of second bracket
74 Bar, channel or equivalent member
78 Safety tether
86 Tether
90 Standing seam Thus, the present invention has been described herein with reference to particular embodiments for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention

What is claimed is:

1. A system for mounting a solar collector panel at an angle $\alpha$ to a flat surface, said solar collector panel supported within a frame, said frame having a top edge and a perpendicular through hole near one end, comprising:
    a) said solar collector panel;
    b) a first bracket, located near said one end of said frame, having a top, a bottom, at right angles to each other, and a first height, said top pivotally fastened to said frame via said through hole and said bottom fastened to said flat surface;
    c) a clip adapted to clamp said frame, said clip clamped to an other end of said frame, transverse to said frame, over said top edge at a lateral side, said lateral side extending from said one end to said other end of said frame;
    d) a second bracket, located near the other end of said frame, having a top leg, a middle leg and a bottom leg, and a second height; said second height being greater than said first height; said middle leg and bottom leg being at right angles to each other; said middle leg and top leg being at a predetermined angle $\beta$ to each other; said clip fastened to said top leg; and
    d) a fastener attaching said clip to said top leg; a length of said fastener running in a direction transverse to said frame;
whereby said solar collector panel is mounted at said angle $\alpha$ to said flat surface.

2. A system as claimed in claim 1 in which said flat surface is a roof.

3. A system as claimed in claim 1 in which said flat surface is a top of a standing seam roof clamp.

4. A system as claimed in claim 1 in which said flat surface is a bar connecting between two standing seam roof clamps.

5. A system as claimed in claim 1 in which said flat surface is a top leg of another second bracket.

6. A system as claimed in claim 5 in which said second bracket is essentially C shaped.

7. A system as claimed in claim 5 in which said second bracket is essentially Z shaped.

8. A system as claimed in claim 5 further comprising a safety tether, connected between said frame and said bracket.

* * * * *